Figure 8:
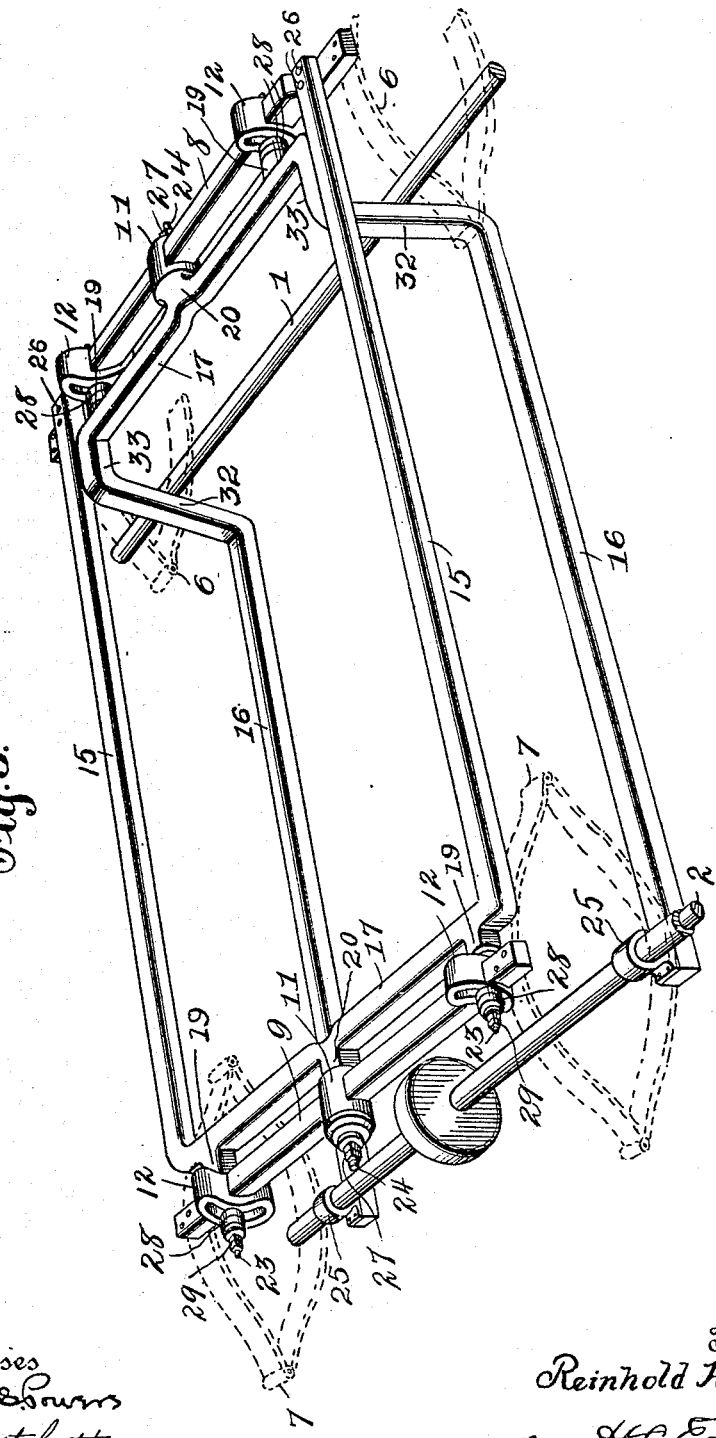

No. 880,025. PATENTED FEB. 25, 1908.
R. HERMAN.
RUNNING GEAR OR SUSPENSION FRAME FOR VEHICLES.
APPLICATION FILED DEC. 15, 1905.
3 SHEETS—SHEET 1.
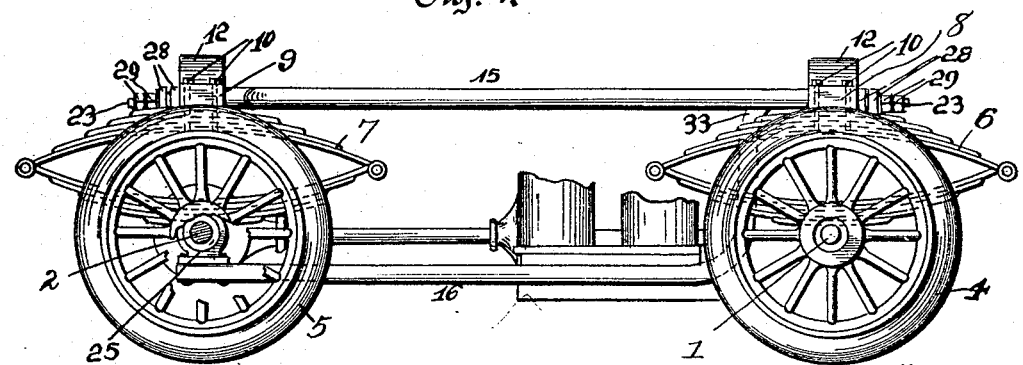
Witnesses:
Inventor.
Reinhold Herman.
by H. C. Evert & Co.,
Attorneys.

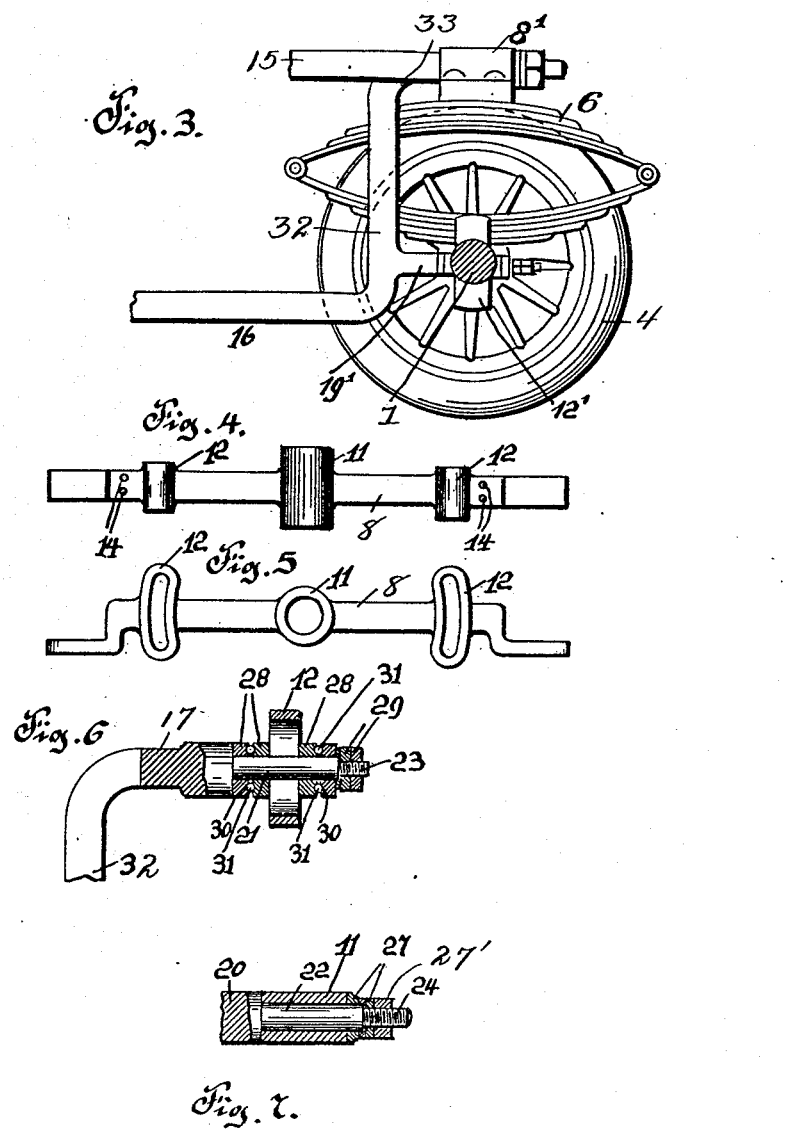

No. 880,025. PATENTED FEB. 25, 1908.
R. HERMAN.
RUNNING GEAR OR SUSPENSION FRAME FOR VEHICLES.
APPLICATION FILED DEC. 15, 1905.

3 SHEETS—SHEET 3.

Witnesses

Inventor
Reinhold Herman
by
Attorneys

UNITED STATES PATENT OFFICE.

REINHOLD HERMAN, OF CRAFTON, PENNSYLVANIA.

RUNNING-GEAR OR SUSPENSION-FRAME FOR VEHICLES.

No. 880,025.     Specification of Letters Patent.     Patented Feb. 25, 1908.

Application filed December 15, 1905. Serial No. 291,876.

*To all whom it may concern:*

Be it known that I, REINHOLD HERMAN, a citizen of the United States of America, residing at Crafton, in the county of Allegheny and State of Pennsylvania, have invented certain new and useful Improvements in Running-Gear or Suspension-Frames for Vehicles, of which the following is a specification, reference being had therein to the accompanying drawing.

This invention relates to certain new and useful improvements in running gears or supporting-frames of vehicles, and more particularly to motor driven vehicles, such as automobiles and the like.

The main object of my invention is to provide means whereby either axle of a vehicle is permitted to rock freely in a vertical plane to conform to the inequalities of the road, without imparting its rocking-movement to the vehicle-body, and thereby maintain the equipoise of the vehicle-body when traveling on rough or uneven surfaces, such as country roads.

A further object of the invention is to obviate the strains and stresses heretofore exerted upon the numerous parts of a vehicle when passing over an irregular or uneven surface, and also to obviate or eliminate the jarring so detrimental to the motors and co-operating mechanism of motor-driven vehicles, thereby greatly increasing the longevity of the vehicle, besides saving to the occupants of the vehicle the general discomforts and dangers incident to the rocking or swaying of the vehicle-body where the movement of the axles is imparted to the vehicle-body.

My invention resides in the novel supporting-frame which is adjustably-connected to the bolsters or axle of the running gear of the vehicle, the said supporting-frame being so connected to the bolsters or to the axles as to insure a perfect equilibration of the vehicle body.

The construction of the supporting-frame, and the manner of connecting the same to the remainder of the running-gear of the vehicle, provides numerous advantages, as it will be observed that it permits of the body of the vehicle being fastened on the upper part of the frame and the mounting of the motor or driving mechanism on the lower part of the frame.

A further advantage in this form of frame suspension is that it effects the distribution of the load of either the motor, or the load carried in the vehicle body on the center trunnions, thereby equalizing the pressure on the springs at all times.

A still further advantage is that the engine load can be more centrally located between the axles, thereby effecting a greater load on the rear driving axle; further the load being distributed to the center of the bolsters, it follows that it must be equally divided on the driving wheels, and thereby insure a greater efficiency of the engine.

Still further, each axle of the vehicle is permitted to adjust itself to any unevenness or inequalities in the road surface entirely independent of the other axle, and, I am also enabled to secure at all times a positive alinement of the engine and driving means on the rear axle, irrespective the position either axle may be placed in.

Referring to the drawings accompanying this application, like numerals of reference designate corresponding parts throughout the different views, in which:—

Figure 1 is a side elevation of my improved running-gear or frame, illustrating the same mounted on wheels, one of said wheels being partly broken away, to better show certain details of construction. Fig. 2 is a plan view of the same. Fig. 3 is a detail side elevation of a portion of a frame illustrating a modified form of construction, showing the axle in section. Fig. 4 is a plan of one of the frame-supporting bolsters. Fig. 5 is an elevation of the same. Fig. 6 is a sectional view taken on the line *x—x* of Fig. 2. Fig. 7 is a similar view taken on the line *y—y* of Fig. 2. Fig. 8 is a detached detail perspective view of the suspension frame and the bolsters, showing a part of the axles, also showing the springs in dotted lines.

That those skilled in the art may better understand and be able to practice the invention, I have shown my improvement in position on the truck of a vehicle 1, indicating the front axle, and 2, the rear axle of said truck. As is the usual practice, the spindles 3, 3, of the front axle 1, are pivotally-connected to the ends of said axle, and the steering mechanism (not shown) is connected to these spindles 3, so as to guide the vehicle. The front wheels 4, 4, are mounted on the spindles 3, while the rear wheels 5, of the truck are mounted usually direct on the ends of the axle 2, the latter being provided with spindles for this purpose. I have also shown front springs 6, 6, and rear springs 7, 7, of the elliptical form, mounted upon the axles 1 and 2, this form being employed conventionally however in order simply to illustrate my invention, as it will be observed that a spring of semi-elliptical or other form could as readily be employed in the practice of the invention.

As shown in the present embodiment of the invention, I mount on the front springs 6, a bolster 8, and on the rear springs 7, a bolster 9, these bolsters being substantially identical one with the other, and of a form shown in detail in Figs. 4 and 5 of the drawings.

To obtain the desired strength, I generally make the bolsters of metal, steel being preferable, and approximately the center of the length of each bolster, the same is provided or formed with a sleeve forming a bearing in which is journaled the trunnions carried by the respective frame-members. Each bolster is also provided with a pair of yokes 12, located one between the sleeve and each end of the bolster, and disposed vertically with respect to the bolster, that is, projecting both above and below the bolster. The preferable embodiment of the invention is to make these yokes slightly curved as shown so that the opening between the side walls of the yokes is upon radii having for its center the longitudinal axis of the sleeve or bearing 11, of the bolster. Thus the side walls of the openings in these yokes are caused to act as guides for the pintles carried by the frame-members as will more fully appear as the description proceeds.

In conjunction with the bolsters above described, I employ a supporting or suspension-frame preferably embodying two members, and which, for the sake of clearness herein, will be designated as upper frame-members, and lower frame-members respectively.

The upper frame-member 15 embodies a pair of parallel side bars connected at their one end by a cross-bar 17, which may be made integral with the side bars, or suitably connected thereto as may be desired and most practical. This cross-bar 17 is located back of, and in close proximity to the rear bolster 9, and has a lug or projection 19 near each end, and a lug or projection 20, approximately centrally of its length. The lug or projection 20, carries a trunnion 22, which is journaled in the sleeve or bearing 11 of the bolster 9, while the lugs or projections 19, carry pintles 21, which are received in the yokes 12, of said bolster.

The trunnion 22 is preferably made of a length sufficient to extend some distance beyond the forward end of the sleeve 11, of bolster 9, and a part of the extending forward end is reduced and screw-threaded as shown at 24, and said trunnion is held in the sleeve or bearings by washers 27, and securing nut 27'. The pintles 21, of the upper frame-member, which are received in the yokes 12, are likewise provided with reduced screw-threaded ends 23, nuts 29, being mounted on said reduced ends to hold the pintles against displacement. On these pintles 21, at each side of the yokes 12, I preferably mount anti-friction thrust bearings, which may be of any desirable form, a practical embodiment being that shown and comprising blocks 28, provided on their confronting faces with races 30, in which are received the anti-friction balls 31. These thrust bearings serve to reduce the friction that may be occasioned by the movement of the bolster with respect to the supporting or suspension-frame.

The forward or free ends of the parallel side bars of the upper frame-member are secured to the front bolster 8, said bolster being provided near each end with openings 14, which receive bolts or rivets 26, passed through the side bars of the upper frame-member and the bolster 8. The lower frame-member is of a form similar to the upper frame-member 15, as it embodies two parallel side bars which are connected at their rear ends to hangers 25, detachably connected to the rear axle 2. The parallel side bars of the lower frame-member lie directly underneath the respective bars of the forward end of the lower frame-member into the front bolster 8, it is necessary to bend the forward portions of the side bars of the lower frame-member upwardly and slightly inclined inwardly as at 32, so as to clear the bars of the upper frame-member, and then project them forwardly, as at 33, and at said forward ends, they are connected to a cross-bar 17, similar to the cross-bar 17 heretofore described for the upper frame-member. This cross-bar 17 of the lower frame-member lies in a plane substantially parallel with the side bars and the cross-bar of the upper frame-member, and like said upper frame-member carries a trunnion 22, received in the sleeve or bearing 11, of the front bolster 8, and pintles 21, received in the yokes 12, of said front bolster 8. The trunnion of this lower frame-member, and the pintles thereof, are secured in the same manner as heretofore described for those of the upper frame-member, said pintles of the lower frame-member having the anti-friction bearings at each side of the yokes, and the same reference numerals have been applied to all of these parts.

In Fig. 3, I have illustrated a modified form of construction by which the same results can be obtained as in the preferred embodiment of the invention, specifically described above. In this modified form of construction, the front bolster designated 8', is provided with the central sleeve or bearing to receive the trunnion of the lower frame-member 16. In lieu however, of the yokes 12, on said bolster, I provide these yokes on the axle 1, as indicated at 12', and instead of the pintles projecting from the cross-bar of the frame, I extend these pintles as indicated at 19', from the upwardly extending parts 32 of the frame.

By either of the constructions described, it will be observed that the upper frame-member is trunnioned in the rear bolster, and the lower frame-member is trunnioned in the front bolster, and in event either the front or the rear wheel on either side of the vehicle should engage an obstruction such as to cause the wheel to rise, the axle will move vertically freely without imparting any of its motion to the supporting-frame for the vehicle-body, thus allowing the body to retain its equilibrium.

In the present illustration of my invention I have shown the lower frame-member supporting the driving-motor of the vehicle, and as this driving motor is usually of considerable weight, the locating thereof on the lower frame-member brings the weight at such a point as to exert a greater traction upon the wheels of the vehicle, and thereby insure greater speed from a less expenditure of power, and further this arrangement of the load has the effect of equalizing the strains or stresses exerted on the running gear of the frame and reducing friction to a minimum. Where the driving motor is so located on the supporting-frame, it is possible to connect the motor to the rear axle 2, of the vehicle, effecting positive alinement at all times and materially easing the running of the vehicle.

It is to be noted also that a suspension frame of the type shown and described affords an effective bracing of the chassis, and further affords a most convenient means of gaining access to the engine for repairs when desired, as by simply removing the nuts from the trunnions and pintles, the running gear may be withdrawn from under the body of the car.

Having thus described my invention what I claim as new and desire to secure by Letters Patent is:

1. A vehicle frame comprising in combination with a pair of axles, and springs mounted thereon, bolsters mounted on the springs, and a pair of superposed frames, one of which is journaled at one end in one of the bolsters, and the other of which is journaled at the opposite end in the other of said bolsters.

2. In a vehicle, the combination with the axles, and the springs mounted thereon, of a bolster mounted on each set of springs, and two superposed frames, the upper of which is journaled at one end in one of the bolsters and rigidly connected at its other end to the other of said bolsters, and the lower of which frames is likewise journaled at one end in one of the bolsters, and rigidly connected at its other end to one of the axles.

3. In a vehicle, a front and a rear bolster, each mounted on springs, and two frame-members arranged one above the other, one of said frame-members journaled in one of the bolsters, and the other of said frame-members journaled in the other of said bolsters.

4. In a vehicle, a front and a rear bolster each yieldingly-mounted, and a pair of frames, one journaled at one end in one of the bolsters, and the other journaled at the opposite end in the other of said bolsters.

5. An automobile frame comprising in connection with the axles and the springs mounted thereon, a pair of bolsters mounted on said springs, and frame-members each having a trunnion, the trunnion of one frame member being journaled in one of said bolsters, and the trunnion of the other frame-member being journaled in the other bolster.

6. An automobile frame comprising in connection with the axles and the springs mounted thereon, bolsters mounted on the springs, and a pair of frame-members, one connected at one of its ends to one of the bolsters, and the other at the opposite end to the opposite bolster.

7. In an automobile frame the combination with the axles, of a front and a rear bolster, an upper frame-member having a trunnion journaled in the rear bolster, and a lower frame-member having a trunnion journaled in the front bolster.

8. In an automobile frame, two superposed frame-members, one having a trunnion at one end and pintles at opposite sides of the trunnion and the other having a trunnion at the opposite end, and pintles at opposite sides of said trunnion, and bolsters in which said trunnions are journaled, and in which the pintles are free to move in a manner to permit the axles to oscillate without imparting movement to the frame-members.

9. In an automobile frame, two frame-members each provided with a trunnion at one end, and each having pintles on the same end, and bolsters in which the respective trunnions are journaled, and in which the respective pintles are free to reciprocate.

10. In an automobile frame, a bolster having a journal bearing arranged centrally of its ends, and provided at opposite sides of said bearing with yokes.

11. In an automobile frame, a yieldingly-mounted bolster, provided centrally of its ends with a journal bearing, and having a yoke at each side of the journal bearing.

12. In an automobile frame, a frame-member provided at one end with a trunnion, and at the same end with pintles at opposite sides of the trunnion.

13. In an automobile frame, a frame-member comprising parallel side bars connected together at one end by a cross-head, a trunnion carried by said cross-head, and a pair of pintles also carried by said cross-head, in combination with a bolster in which the trunnion is journaled, and segmental-yokes carried by the bolster to receive the pintles and in which the latter are free to move as the frame is rocked.

14. In an automobile frame, a frame-member carrying a trunnion at one end, a bolster in which said trunnion is journaled, and pintles carried by the frame-member and on which the bolster is free to rock.

15. In an automobile frame, an axle, and a bolster yieldingly-mounted on the axle, in combination with a frame-member carrying a trunnion at one end journaled in the bolster, and having pintles on which the bolster is free to rock.

16. In an automobile frame, a pair of axles, and a bolster yieldingly-mounted on each axle, in combination with a pair of frame-members, one frame-member having a trunnion at one end journaled in one of the bolsters, the other frame-member having a trunnion at its opposite end journaled in the opposite bolster, and pintles carried by each frame-member, one of said bolsters free to rock on the pintles of one frame-member, and the other bolster free to rock on the pintles of the other frame-member.

17. In a vehicle, a suspension-frame embodying a pair of frame-members one of which is trunnioned at one end in the front bolster of the vehicle, and the other of which is trunnioned at the opposite end in the rear bolster of the vehicle, and means whereby said bolsters may rock independently of the frame.

18. The combination with the axles, and the bolsters yieldingly-mounted on said axles, of a suspension-frame trunnioned in the bolsters, and means whereby said bolsters may rock without imparting movement to the frame.

19. In automobile frames, a frame-member embodying parallel side-bars suspended at one end from an axle of an automobile, said bars having their other end bent upwardly, a cross-bar connecting the upwardly-bent ends and lying in substantially the same plane as the bolster of the automobile, and a trunnion carried by said cross-bar, and journaled in one of said bolsters.

20. A supporting-frame for automobiles comprising in combination with a front and a rear bolster, each provided centrally of its end with a bearing and at opposite sides of said bearings with yokes, a pair of superposed frame-members, one of which is trunnioned at one end in the rear bolster, pintles carried thereby and engaging in the yoke of said rear bolster, the other of said frame-members trunnioned at one end in the front bolster, pintles carried by said frame-member and engaging in the yokes of said front bolster, and thrust-bearings carried by each set of pintles at opposite sides of the yokes.

21. In an automobile frame, the combination with a bolster, and a frame-member, comprising parallel side-bars connected at their rear ends to the rear axle of the automobile, said side-bars having upwardly-bent ends, a cross-bar connecting said upwardly-bent ends, and a trunnion carried by said cross-bar and journaled in said bolster.

22. In an automobile, the combination with the axles and the bolster mounted above said axles, of a pair of superposed frame-members, the upper of which lies in substantially the same plane as the bolsters, and is journaled at one end in one of said bolsters, and the other of which frame-members has side-bars lying in a plane below said axles, and is journaled at one end in the other of said bolsters.

23. A supporting-frame for automobiles, comprising in combination with a front and a rear bolster, a pair of superposed sections, one of which is movably-connected to the front bolster, and the other of which is movably-connected to the rear bolster, one of said members lying in substantially the same plane as the bolsters, and the other of said members having the sides thereof lying in a plane below the axles of the vehicle.

24. A supporting-frame for automobiles, comprising in combination with a front and a rear bolster, a pair of superposed sections, the upper of said sections movably-connected to the rear bolster and rigidly connected to the front bolster, and the lower of which sections is movably-connected to the front bolster and rigidly-connected at its rear end to the rear axle of the automobile.

25. A supporting-frame for automobiles, comprising in combination with a front and a rear bolster, a pair of superposed sections, one of which is movably-connected to the front bolster, and the other of which is movably-connected to the rear bolster, and means for fixedly-attaching to the front bolster that section which is movably-connected to the rear bolster, and means for fixedly-attaching to the rear axle of the automobile that section which is movably-connected to the front bolster.

26. A supporting frame for automobiles comprising in combination with a front and a rear bolster, each provided with a pair of yokes, a pair of superposed frame members, one of which is trunnioned at one end in the rear bolster, pintles carried thereby and engaging in the yokes of said rear bolster, the other of said frame members trunnioned at one end in the front bolster, and pintles carried by said last mentioned frame member and engaging in the yokes of the front bolster.

27. A supporting frame for automobiles comprising in combination with a front and a rear bolster, a pair of superposed frame members, one of which is trunnioned at one end in the rear bolster and the other of which is trunnioned at one end in the front bolster, and means carried by the bolster and the frame members to constitute guides for the frame members.

28. A vehicle frame comprising the combination with a pair of axles and springs mounted thereon, of bolsters mounted on the springs, a pair of superposed frame members, one of which is journaled at one end in one of the bolsters, and the other of which is journaled at the opposite end in the other of said bolsters, and means carried by the frame members and bolsters to constitute guides for the frame members.

29. In a vehicle, the combination with the axles and springs mounted thereon, of a bolster mounted on each of said springs, two superposed frame members, the upper of which is journaled at one end in one of the bolsters and rigidly connected at its other end to the other of said bolsters, and the lower of which is likewise journaled at one end in one of the bolsters and rigidly connected at its other end to one of the axles of the vehicle, and pintles carried by said frames and adapted to engage in the bolsters.

In testimony whereof I affix my signature in the presence of two witnesses.

REINHOLD HERMAN.

Witnesses:
J. M. WILSON,
FRANK S. APPLEMAN.